(No Model.) 2 Sheets—Sheet 2.
W. I. & R. C. SIMMONS.
SAW SET AND JOINTER.
No. 546,964. Patented Sept. 24, 1895.
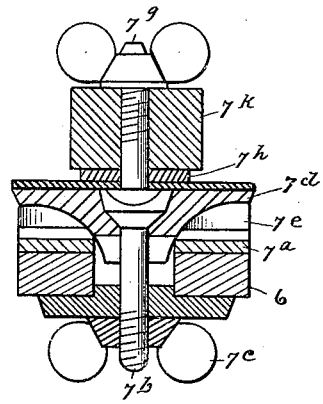
Fig. 4.
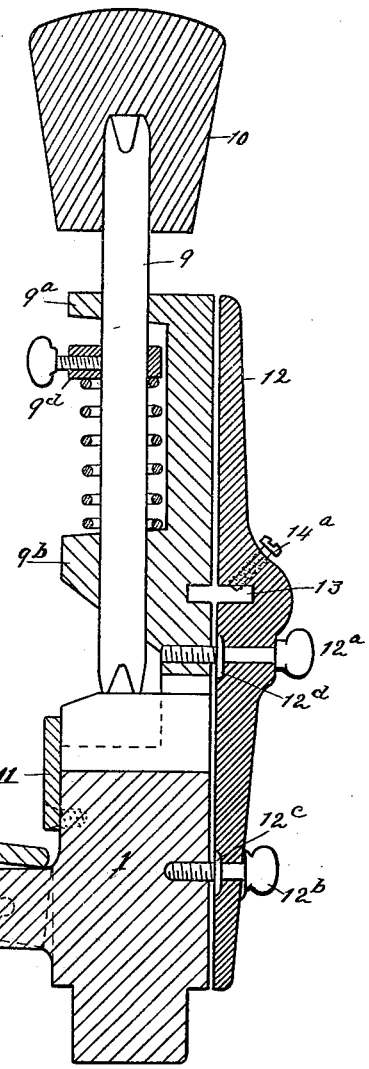
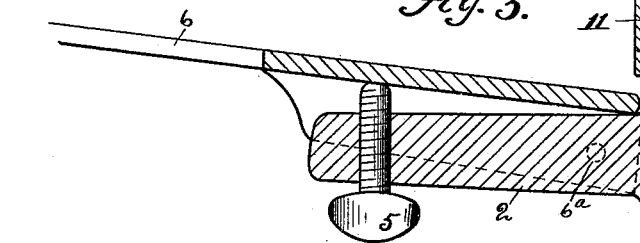
Fig. 3.
WITNESSES
F. Clough
H. H. Bradford
INVENTORS:
William I. Simmons
Richmond C. Simmons
By Parker & Burton
Attorneys.

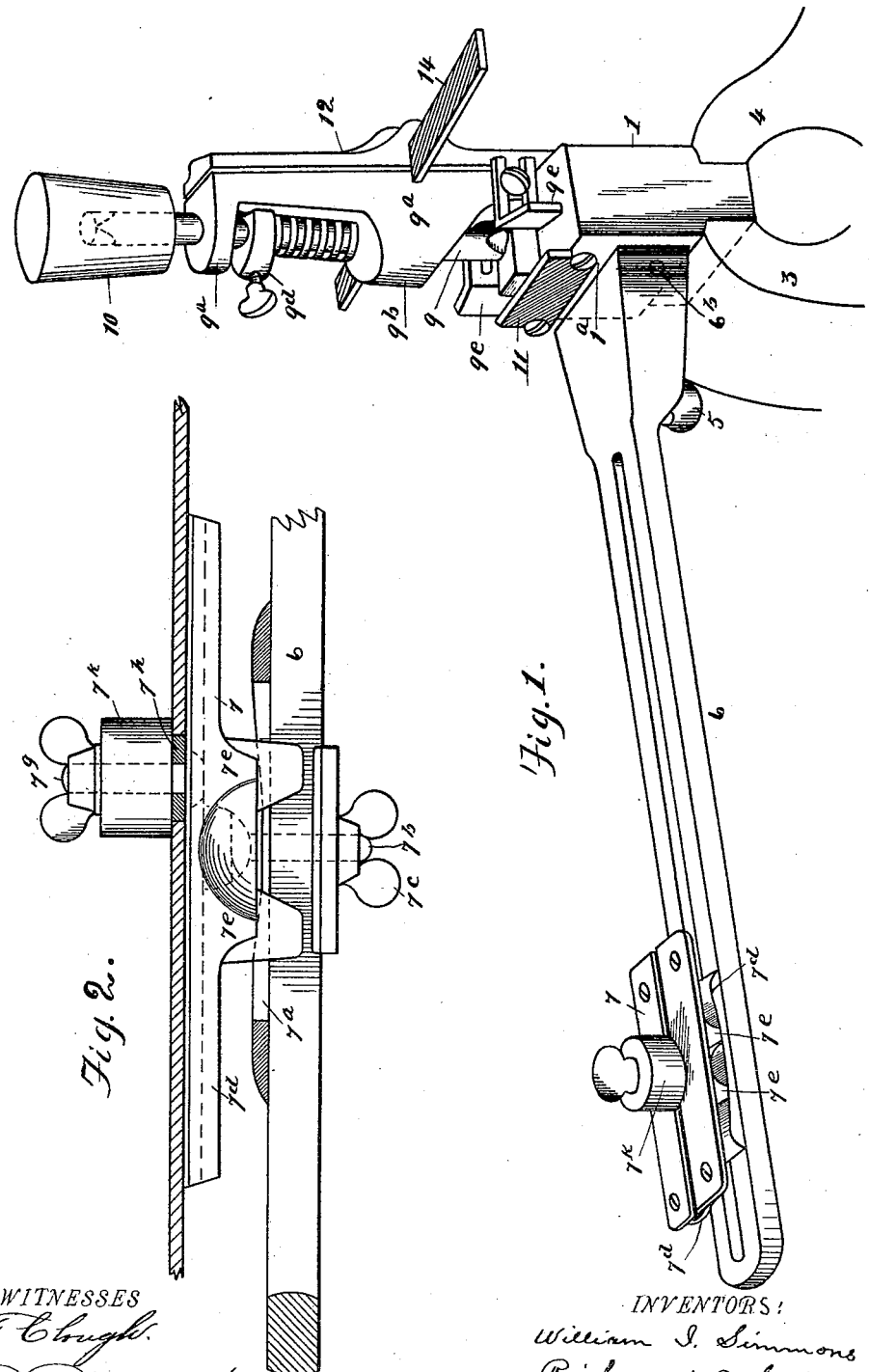

UNITED STATES PATENT OFFICE.

WILLIAM I. SIMMONS AND RICHMOND C. SIMMONS, OF NORTHVILLE, MICHIGAN; SAID RICHMOND C. SIMMONS ASSIGNOR TO SAID WILLIAM I. SIMMONS.

SAW SET AND JOINTER.

SPECIFICATION forming part of Letters Patent No. 546,964, dated September 24, 1895.

Application filed March 16, 1895. Serial No. 541,944. (No model.)

*To all whom it may concern:*

Be it known that we, WILLIAM I. SIMMONS and RICHMOND C. SIMMONS, citizens of the United States, residing at Northville, county of Wayne, State of Michigan, have invented a certain new and useful Improvement in Saw Sets and Jointers; and we declare the following to be a full, clear, and exact description of the invention, such as will enable others skilled in the art to which it pertains to make and use the same, reference being had to the accompanying drawings, which form a part of this specification.

This invention relates to saw setting and jointing machines, and has for its object an improvement in machines adapted to set and joint either circular or straight saws.

In the drawings, Figure 1 shows the device in perspective. Fig. 2 shows a vertical section through the holder used with circular saws. Fig. 3 shows a vertical section through the setting part of the machine. Fig. 4 shows a cross-section through the stud upon which circular saws are held.

1 indicates the anvil-support, the bottom part of which is shaped to be received and held between the jaws of a common vise 3 4. On one side of the anvil-support projects an arm 2, provided near its outer end with a winged bearing-screw 5. To the arm, near the anvil-support, is hinged a track 6. This track acts as a track along which the center holder 7 can be shifted, and also supports the center supporter. The track itself turns on hinges $6^a$ $6^b$ and is elevated or depressed by means of the screw 5. The track is slotted for nearly its entire length and in the slot slides the center support 7. The center support consists of a saddle-piece $7^a$, adjustable along the track and adapted to be clamped thereto by the bolt $7^b$ and winged nut $7^c$. The bolt $7^b$ is itself swiveled in the framework of a table $7^d$. The upper face of the saddle $7^a$ is curved with its lower or middle part thinner than either end, and the frame of the table $7^d$ has two bearings $7^e$ $7^e$, which engage with the curved surface. The upper face of the table is plane and is provided with a slot parallel to the slot of the track 6. The edges of the slot in the upper surface of the table project or overhang, leaving room under them for the head of a clamping-bolt $7^g$. The clamping-bolt $7^g$ passes through and holds to the table two washers $7^h$ $7^k$, one of which $7^h$ acts as a filler for the eye of the saw 8, and the other of which $7^k$ aids in clamping the saw on the plate.

By combined adjustment of the track 6 and the holder 7 any desired angle between the plane of the table and the plane of the face of the anvil $1^a$ can be arranged. By means of the bearing-screw 5 the outer end of the track can be adjusted. The center support 7 can be adjusted for distance and for very small saws. The holding-washers $7^h$ $7^k$ can be shifted along the table, and the angle of inclination of the table can be adjusted so as to present the saw at the proper angle to produce the desired set. For flat saws the parts just described, except the washers and nut $7^h$ $7^k$ $7^g$, are used in precisely the same way.

The setting is produced by striking the tooth on the anvil with a punch 9. This punch is held in an upright arm $9^a$, which serves at the same time to support the punch and forms one of the bearings of the jointer, to be hereinafter described. On the upright arm are two lugs $9^b$ $9^c$, through which the round stem of the punch 9 passes, and between the lugs surrounding the stem of the punch is a coiled spring, the lower end of which bears against the lower lug $9^b$, and the upper end of which bears against a collar $9^d$, that is held by a set-screw to the shank of the punch. The collar $9^d$ has a flat side that engages the upright $9^a$. It is adapted to move vertically along the upright, but cannot itself turn, and holds the shank of the punch 9 from turning. Both ends of the punch are provided with facets adapted to different sizes of saws or forms of teeth, and the punch is reversible. Consequently with a single punch many different classes of saws can be treated.

$9^e$ $9^e$ are guards held to the upright by screws adapted to be adjusted to permit the teeth of the saw to lay over the anvil just the proper distance. The punch is actuated through the medium of a heavy removable head 10.

On that side of the anvil-support 1 which lies toward the center support is a short file 11, which is used as a jointer for circular saws.

That side of the upright which is opposite the center support is flat and smooth, and opposed to it is a guide 12, held at an adjustable distance from it by two screws $12^a$ $12^b$, the threaded parts of which enter suitably-threaded holes in the anvil-support 1 and upright, while the parts of the screws which pass through the guide 12 are smooth, and the screws are held in place with respect to the guard by collars $12^d$ $12^c$.

While the guide is adjustable to and from the anvil and upright, it should be kept substantially parallel therewith. At right angles to the opening between the two is a socket 13, in which is inserted a file 14, to be held in place by a set-screw $14^a$. The parts just described form the jointer for straight saws or for saws like cross-cut saws, which are slightly curved. The guide 12, acting in conjunction with the upright, holds the saw with its blade at right angles to the file 14, but permits the saw to be freely reciprocated over the file until it is properly jointed.

What we claim is—

1. In a saw setting machine, the combination of an anvil and its support, with an upright arm adapted to carry a vertically moving setting punch, a track arm hinged to the anvil support and adjustable through a vertical angle with respect thereto, a saddle adjustable along the track arm, a plate carried by the saddle and adjustable with respect thereto through an angle in the same plane with that of the angular adjustment of the track arm, a reversible setting punch provided with facets on each end, and a collar on said punch having one side flattened and adapted to bear against the upright to prevent the punch from turning in its bearings, substantially as described.

2. In a saw set and jointer, the combination of a main support, a jointing file secured thereto, an arm hinged to the main support, a lug projecting from the main support, a bearing screw adapted to adjust the angularity of the hinged arm, a centering device comprising a saddle adapted to slide along the hinged arm, a tabular piece adjustable on the saddle, and means for securing the saw to the tabular piece, substantially as described.

In testimony whereof we sign this specification in the presence of two witnesses.

WILLIAM I. SIMMONS.
RICHMOND C. SIMMONS.

Witnesses:
M. A. PATTERSON,
DARWIN B. NORTHROP.